United States Patent
Meyer

(10) Patent No.: US 7,277,427 B1
(45) Date of Patent: Oct. 2, 2007

(54) SPATIALLY DISTRIBUTED ROUTING SWITCH

(75) Inventor: Charles S. Meyer, Nevada City, CA (US)

(73) Assignee: Nvision, Inc., Grass Valley, CA (US)

( * ) Notice: Subject to any disclaimer, the term of this patent is extended or adjusted under 35 U.S.C. 154(b) by 1016 days.

(21) Appl. No.: 10/364,022

(22) Filed: Feb. 10, 2003

(51) Int. Cl.
    *H04L 12/50* (2006.01)
(52) U.S. Cl. .................. 370/388; 370/355; 370/362; 370/380; 370/392
(58) Field of Classification Search .............. 370/335, 370/362, 364, 366, 367, 380, 386, 387, 388, 370/389, 392, 423, 395.1
    See application file for complete search history.

(56) References Cited

U.S. PATENT DOCUMENTS

| | | | | | |
|---|---|---|---|---|---|
| 4,792,970 | A | * | 12/1988 | Molnar | 379/284 |
| 4,796,254 | A | * | 1/1989 | van Baardwijk et al. | 370/366 |
| 5,008,878 | A | * | 4/1991 | Ahmadi et al. | 370/353 |
| 5,214,640 | A | * | 5/1993 | Sakurai et al. | 370/355 |
| 5,258,999 | A | * | 11/1993 | Wernimont et al. | 375/220 |
| 6,085,163 | A | * | 7/2000 | Todd | 704/500 |
| 6,104,997 | A | * | 8/2000 | Shuholm | 704/500 |
| 6,212,199 | B1 | * | 4/2001 | Oxford | 370/466 |
| 6,392,707 | B1 | * | 5/2002 | Cooper et al. | 348/515 |
| 6,446,037 | B1 | * | 9/2002 | Fielder et al. | 704/229 |
| 6,757,282 | B1 | * | 6/2004 | Ofek | 370/389 |
| 7,042,874 | B1 | * | 5/2006 | Uetake et al. | 370/379 |
| 2003/0202531 | A1 | * | 10/2003 | Dooley et al. | 370/462 |

* cited by examiner

*Primary Examiner*—Edan Orgad
*Assistant Examiner*—Andrew C. Lee
(74) *Attorney, Agent, or Firm*—John Smith-Hill; Smith-Hill and Bedell

(57) ABSTRACT

A router has N1 local signal input terminals for connection to respective local signal sources for supplying respective local input signals, a local output interface including M1 local signal output terminals, and an input expansion terminal. A signal received at any one of the N1 local signal input terminals can be routed selectively to any one or more of the M1 local signal output terminals and a signal received at the input expansion terminal can be routed selectively to any one or more of the M1 local signal output terminals. An input signal received at a local signal input terminal is delayed relative to an input signal received at the input expansion terminal by a selectively adjustable amount to achieve a predetermined time relationship between the input signals at the local output interface.

12 Claims, 2 Drawing Sheets

SPATIALLY DISTRIBUTED ROUTING SWITCH

CROSS-REFERENCE TO RELATED APPLICATION

The subject matter disclosed in this application is related to subject matter disclosed in copending patent application Ser. No. 09/661,844 filed Sep. 14, 2000, now U.S. Pat. No. 6,680,939, the entire disclosure of which is hereby incorporated by reference herein for all purposes.

BACKGROUND OF THE INVENTION

This invention relates to a spatially distributed routing switch.

The AES3 (AES standard for digital audio engineering-serial transmission format for two-channel linearly represented digital audio data) serial data stream developed by the Audio Engineering Society is composed of frames. Each AES3 frame represents one two-channel audio sample and is composed of two subframes, each of 32 bits. The sample rate is typically 48 kHz or 96 kHz (corresponding to sample periods of about 20 µs and about 10 µs respectively) and sample rates as high as 192 kHz (about 5 µs) are becoming more common.

U.S. patent application Ser. No. 09/661,844 discloses a routing switch designed for routing signals encoded as AES3 serial data streams. The routing switch comprises multiple routers each having a plurality of signal inputs, a plurality of signal outputs, an expansion input, an expansion output, and a switch core for selectively routing a signal received at any one of the signal inputs to any one or more of the outputs and for routing a signal received at the expansion input to any one or more of the signal outputs. The expansion output of each router is connected to the expansion inputs of the other routers. Consequently, each input signal of each router is available to each output of each router.

In a proposed implementation of the routing switch described in patent application Ser. No. 09/661,844, each router has 256 signal inputs, each receiving a signal encoded as an AES3 serial data stream, and is composed of four router modules each having 64 signal outputs, so that the router serves a total of 256 signal outputs. In general, fewer than 256 of the data streams received at the signal inputs of the router module will convey information that is to be routed to a signal output of the router, and the data streams that do not convey useful information may be AES3 silence.

In the proposed implementation of the routing switch, the 256 data streams received at the signal inputs of each router are supplied to the expansion output of the router in time interleaved format. The composite data stream received at the expansion input of a router, i.e. the data stream composed of multiple AES3 data streams, is demultiplexed and a selected data stream may be routed to any signal output of the router.

In an application of the routing switch, input data streams received at signal inputs of two or more routers may be used to create an audio image of multiple data streams outputted by one of the routers. In order for the output data streams to be image accurate, the input data streams must have the same sample rate and the sample clocks must be aligned in time to within less than one sample period. Loss of time alignment by as little as one sample period (about 10 µs for a 96 kHz sample rate) can lead to perceptible degradation of the audio image. When the several routers are in relatively close physical proximity (e.g closer than 100 m), it is possible to use a common master clock and cables of equal length to ensure that the sample clocks are of the same frequency and are time aligned across the signal sources.

The global positioning system (GPS) employs a constellation of satellites orbiting the earth and each emitting a signal coded in accordance with a pseudo random digital code. The pseudo random code signal allows two terrestrial GPS receivers, no matter their relative positions, to measure lapse of time relative to a common time origin with a precision of 1 ns.

SUMMARY OF THE INVENTION

In accordance with a first aspect of the invention there is provided a method of operating a router having N1 local signal input terminals connected to respective local signal sources which supply respective local input signals, a local output interface including M1 local signal output terminals, and an input expansion terminal, and including a routing means for routing a signal received at any one of the N1 local signal input terminals selectively to any one or more of the M1 local signal output terminals and for routing a signal received at the input expansion terminal selectively to any one or more of the M1 local signal output terminals, the method comprising employing the routing means to supply a first input signal received at one of the N1 local input terminals to at least a first of the M1 local output terminals, employing the routing means to supply a second input signal received at the input expansion terminal to at least a second of the M1 local output terminals, and delaying the first input signal relative to the second input signal by a selectively adjustable amount to achieve a predetermined time relationship between the first and second input signals at the local output interface.

In accordance with a second aspect of the invention there is provided a router having N1 local signal input terminals for connection to respective local signal sources for supplying respective local input signals, a local output interface including M1 local signal output terminals, and an input expansion terminal, and including a routing means for routing a signal received at any one of the N1 local signal input terminals selectively to any one or more of the M1 local signal output terminals and for routing a signal received at the input expansion terminal selectively to any one or more of the M1 local signal output terminals, and a delay for delaying an input signal received at a local signal input terminal relative to an input signal received at the input expansion terminal by a selectively adjustable amount to achieve a predetermined time relationship between the input signals at the local output interface.

In accordance with a third aspect of the invention there is provided a method of operating a routing switch including a first router having N1 local signal input terminals, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals and an output expansion terminal and including a second routing means for selectively routing a signal received at any one of the N2 local signal input terminals to the output expansion terminal, and wherein the output expansion terminal of second router is connected to the input expansion terminal of the first router, and wherein the method comprises employing the first router to supply a first signal received at one of the N1 local input terminals to at least a first of the M1 local output terminals, employing the second router to supply a second signal received at one of the N2 local input terminals to the input expansion terminal of the first router, employing the first router to supply the second signal to at least a second of the M1 local output terminals, and delaying the first signal relative to the second signal by a selectively adjustable amount to achieve a predetermined time relationship between the first and second signals at the local output interface of the first router.

In accordance with a fourth aspect of the invention there is provided a routing switch comprising a first router having N1 local signal input terminals, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals and an output expansion terminal and including a second routing means for selectively routing a signal received at any one of the N2 local signal input terminals to the output expansion terminal, and wherein the output expansion terminal of the second router is connected to the input expansion terminal of the first router, and the first router includes a delay for delaying an input signal received at a local signal input terminal of the first router relative to an input signal received at the input expansion terminal of the first router by a selectively adjustable amount to achieve a predetermined time relationship between the input signals at the local output interface of the first router.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
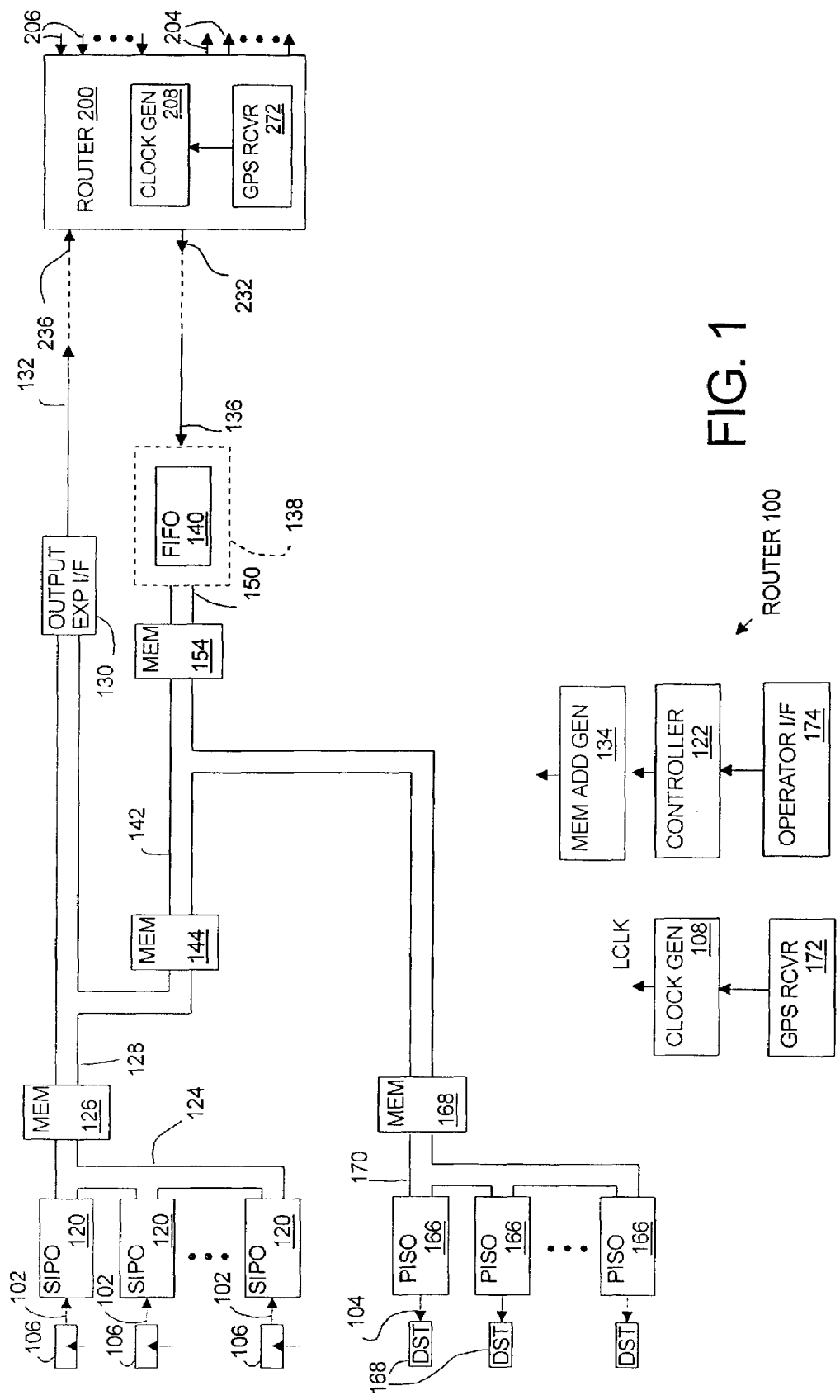
FIG. 1 is a schematic block diagram of a first routing switch in accordance with the present invention.

The routing switch shown in FIG. 1 is based on the architecture described in patent application Ser. No. 09/661,844, but simplified in some respects to facilitate discussion of the present invention.

FIG. 1 illustrates a spatially distributed routing switch comprising two routers 100 and 200. The two routers are of the same architecture. Accordingly, the router 200 is not shown at as high a level of detail as the router 100 and the reference numeral applied to an element of the router 200 is the same as the reference numeral applied to the corresponding element of the router 100 except for the leading digit being 2 instead of 1. Each of the routers may correspond to one of the router modules described in patent application Ser. No. 09/661,844. However, it will be appreciated that in a practical implementation each router may be composed of multiple router modules, e.g. four router modules as in the case of patent application Ser. No. 09/661,844.

The router 100 has 256 local inputs 102 and 64 local outputs 104. The local inputs are connected to respective local signal sources 106, which operate under control of a common sampling clock LCLK generated by a local clock generator 108 included in the router and generate serial AES3 data streams of equal sample period. For convenience, the sample period of the AES3 data streams is referred to herein as T. Accordingly, the duration of one AES3 frame is T and the duration of a subframe is T/2. The cable lengths from the local clock generator 108 to the local signal sources 106 are equal in order to ensure phase coherency of the sampling clock across the local signal sources. Further, the cable lengths from the local signal sources to the router are equal in order to maintain phase coherency across the local inputs.

The serial data streams received at the inputs 102 of the router 100 are converted to 32-bit wide parallel format, each data word containing one subframe of an AES3 frame, by respective SIPO registers 120. Each SIPO 120 is assigned a unique and unchanging position in a sequence that contains all 256 SIPOs. A SIPO's position in the sequence might be determined by, for example, the physical location of the input 102 to which the SIPO is connected. A controller 122 read enables the SIPOs sequentially, in accordance with the assigned positions in the sequence, and accordingly the 32-bit parallel data words generated in response to a single sample clock are placed sequentially on an input data bus 124. The controller 122 controls the read enable signals supplied to the SIPOs and controls the timing of the operating cycles of the bus 124 so that the parallel data words are placed on the bus in successive operating cycles of the bus. The operating cycle of the input data bus 124 has a duration of T/512. Thus, 512 operating cycles have a total duration of T.

The data words placed on the input bus 124 during the successive operating cycles are written to a memory 126 and are read from the memory 126 onto a first intermediate bus 128. The duration of the operating cycle of the bus 128 is 512 times the duration of the operating cycle of the bus 124, i.e. T, but the controller 122 divides the operating cycle of the bus 128 into 512 time slots.

The memory 126 is composed of two pages. During one succession of 512 operating cycles of the bus 124, the 512 data words that are generated in response to a single sample clock are written to page 0 of the memory and data words previously written to page 1 are read and placed on the first intermediate bus 128 in respective time slots of one operating cycle of the bus 128, and vice versa during the next succession of 512 operating cycles of the input bus 124. The memory 126 writes data words into the addresses of the selected page in strict order of time. During the read operation, the data words stored in the page that is being read are placed on the bus 128 in strict order of address. Accordingly, the sequence in which the subframe data words are placed on the bus 124 is preserved. The bus 128 carries all 256 input signals, in time interleaved format.

Read and write addresses for controlling read and write access to the memory are generated by a memory address generator 134, which is controlled by the controller 122.

Depending on timing constraints, the two 32-bit words derived from one AES3 frame might be placed on the input bus 124 either in consecutive operating cycles of the bus, so that they are written into consecutive addresses of the memory 126, or in two cycles that are spaced by 255 cycles, each containing one data word from each of the other SIPOs. In either case, all the data words generated by the signal sources 106 in response to one sample clock are placed on the bus 128 during the same operating cycle of the bus, so phase coherency across the local signal sources is preserved on the bus 128.

The first intermediate bus 128 is coupled to a second intermediate bus 142. Specifically, a memory 144 buffers the data on the first intermediate bus onto the second intermediate bus. In an implementation of the invention, it might be desirable to divide the second intermediate bus into two segments, as described in patent application Ser. No. 09/661,844.

The memory 144 is composed of at least three pages and the address offset between the page that is read and the page that is written is selectively adjustable. Suppose, for example, that the memory 144 is composed of eight pages and the address offset is one page. During a first operating cycle of the first intermediate bus 128, the memory 144 writes the data on the bus 128 into page 0 in strict order of time slot during the operating cycle of the bus 128 and reads the data from page 7 and places it on the bus 142 in strict order of address. During the second operating cycle of the bus 128, the memory 144 writes the data on the bus 128 into page 1 and reads the data from page 0. During the eighth operating cycle, the memory 144 writes to page 7 and reads from page 6. Thus, the data that is read from the memory is delayed by T relative to the data that is written to the memory, and by increasing the address offset, the duration of the delay can be increased in steps up to a maximum of 7T. The addresses for controlling read and write access to the memory 144 are generated by the memory address generator 134.

The sequence of data words on the first intermediate bus 128 is preserved on the second intermediate bus 142. The operating cycle of the bus 142 is equal to T, but whereas the operating cycle of the bus 128 is divided into 512 time slots, the operating cycle of the bus 142 is divided into 1024 time slots. The controller 122 controls the operation of the memory 144 so that the 512 data words supplied by the first intermediate bus 128 during one operating cycle are placed in every other time slot during the operating cycle of the second intermediate bus 142.

The data on the bus 128 is supplied to an output expansion interface 130 which serializes the parallel data and provides a composite serial output data stream containing all 256 input data streams in time interleaved format to an output expansion terminal 132 of the router 100. The output expansion interface 130 places the sequence of 512 serial data words, derived from 256 AES3 samples acquired in response to one sample clock, in a single interface frame having a duration T and bounded by framing words. The output expansion terminal 132 is connected to a transmitter (not shown), such as a microwave transmitter or a laser driver coupled to an optical fiber, which transmits the composite data stream to the router 200.

The composite data stream transmitted from the output expansion terminal 132 of the router 100 via the transmitter is received at a receiver (not shown) of the router 200 and is supplied to an input expansion terminal 236 of the router 200. Similarly, a composite output data stream transmitted from an output expansion terminal 232 of the router 200 and containing data words derived from 256 AES3 data streams in time interleaved format is supplied by way of a receiver (not shown) to an input expansion terminal 136 of the router 100. The input expansion terminal 136 of the router 100 is connected to an input expansion interface 138.

The input expansion interface 138 strips the framing words from the composite data stream received at the input expansion terminal 136, converts the serial data words to parallel form and places the sequence of parallel data words on an input expansion bus 150. The operating cycles of the bus 150 are synchronized to the operating cycles of the bus 142. The input expansion interface 138 includes a variable length FIFO 140 which delays the data words by an amount such that the 512 consecutive data words received in each interface frame are placed on the bus 150 during the same operating cycle. Thus, regardless of the propagation delay between the output 232 of the router 200 and the input 136 of the router 100, the overall delay $\tau_{in}$ through the input expansion interface 138 is such that all the data words of a given interface frame are placed on the bus 150 during the same operating cycle and phase coherency across the local inputs of the router 200 is preserved.

The parallel data on the input expansion bus 150 is written to a buffer memory 154 which buffers the parallel data onto the second intermediate bus 142. The buffer memory 154 operates in similar fashion to the memory 126, employing addresses supplied by the memory address generator 134, and delays the data on the input expansion bus 150 by a time T. The controller 122 coordinates the write cycles of the buffer memory 154 with the write cycles of the memory 144 so that the data words provided by the buses 128 and 150 are interleaved on the second intermediate bus 142. Consequently, during one operating cycle of the bus 142, one data word of each subframe of each of the 512 data streams is placed on the bus 142.

The mode of operation described above results in each local input of the routing switch being mapped to one pair of time slots in the operating cycle of the bus 142, one time slot of the pair containing the subframe A data word of the data stream received at that input of the routing switch and the other time slot containing the subframe B data word of that data stream.

The data on the bus 142 is written into a memory 168 and the contents of the memory 168 are placed on an output bus 170. The memory 168 operates in similar fashion to the memory 126 and delays the data on the bus 142 by a time T.

The router 100 includes 64 parallel in, serial out registers (PISOs) 166 which read the output bus 170 and are respectively connected to the outputs 104 of the router. In order to route the signal received at one of the inputs of the routing switch to one of the local outputs 104 served by the router 100, the controller 122, in response to an operator command provided by a operator interface 174, selects the PISO 166 that is connected to the particular output 104 and issues a command to that PISO to read the bus 170 during the pair of time slots to which the particular input is mapped. The selected PISO reads the bus 170 during the selected pair of time slots and converts the parallel subframe data words to serial form. Each of the PISOs 166 is included in an output processor (not otherwise shown), which also includes an AES3 encoder for combining the two serial subframe data words to generate an AES3 frame. The output processor provides the AES3 data stream to the selected output 104. Each output 104 is connected to a signal destination 168, which may include an AES3 decoder for generating audio sample data from the AES3 data stream.

Let us assume initially that the router 200 is close to the router 100 so that propagation time of signals between the routers can be ignored. Let us further assume (a) that the clock generator 108 of the router 100 is connected to the clock generator 208 of the router 200 so that the two clock generators operate in lock step with negligible phase difference, (b) that the input and output expansion interfaces impose zero delay, (c) that a succession of 512 consecutive operating cycles of the bus 124, in which all the samples acquired by the sources 106 in response to a single sample clock are placed on the bus 124, starts at an arbitrary reference time 0, and (d) that the memory 144 is set with a minimum address offset between the read page and the write page and accordingly the memory 144 imposes a delay of T on data transferred from the bus 128 to the bus 142. In this case, each data sample that is placed on the input data bus 124 during the interval 0 to T is placed on the second intermediate bus 142 during the interval 2T to 3T. Similarly, each data sample that is placed on the input data bus of the router 200 during the interval 0 to T is placed on the intermediate data bus 142 during the interval 2T to 3T. Accordingly, there is phase coherency on the bus 142 across all the signal sources and the output data streams provided by the PISOs 166 are image accurate.

Of course, even assuming negligible propagation delay between the routers, in practice the data samples placed on the input data bus of the router 200 would be delayed relative to the data samples placed on the input data bus 124 by $\tau_{in}+\tau_{out}$, where $\tau_{out}$ is the propagation delay through the output expansion interface of the router 200 and $\tau_{in}$ is the propagation delay through the input expansion interface 138 (exclusive of the FIFO 140). Assuming that $\tau_{in}+\tau_{out}$ is less than T, phase coherency on the bus 142 can be achieved by increasing the address offset of the memory 144 by one step so that the delay imposed by the memory 144 is 2T and setting the delay $\tau_{fifo}$ of the FIFO equal to $2T-(\tau_{in}+\tau_{out})$. The delay of the FIFO 140 is adjusted automatically by the input expansion interface, based on the timing of the framing words of the interface frames relative to the operating cycles of the bus 150, to ensure that the 512 consecutive data words received in each interface frame are placed on the bus 150 during the same operating cycle.

Let us now suppose that the router 200 is 30 km from the router 100, that signals are transmitted between the routers 100 and 200 by microwave link and thus have a propagation velocity of about $3*10^8$ km/s, and that the operator of the routing switch is at the location of the router 100 and is able to transmit control signals to the router 200. The propagation time for signals between the routers 100 and 200 would be approximately 100 µs or about 10*T and could not be neglected. This propagation time is too long to allow phase coherency to be maintained over the signal sources of the routing switch by using the clock generator of the router 100 to control the clock generator of the router 200.

The clock generators 108 and 208 are controlled by GPS receivers 172 and 272 respectively. This allows the clock generators to generate clock signals that are of the same frequency, within 1 ppm, and are in phase. The receivers measure GPS time to an accuracy of 1 ns.

The operator can issue a command to the controllers of the two routers that they should each start sampling at a time (measured in GPS time) that is sufficiently far in the future to allow the router 200 to respond to the command. This command enables the respective controllers to control the samplers of the local signal sources so that they will all start sampling at the same time and at the same frequency. Let us then assume that the operator wishes to provide at the output interface of the router 100 an audio image composed of an input data stream from a local signal source 106 of the router 100 and an input data stream from a local signal source 206 of the router 200. In this event, the first sample acquired by a local signal source of the router 200 is placed on the input bus of the router 200 during the interval from 0 to T and arrives at the output expansion terminal 232 during the interval $T+\tau_{out}$ to $2T+\tau_{out}$ and arrives at the input expansion terminal 136 during the interval $T+\theta_{out}+\tau_{prop}$ to $2T+\tau_{out}+\tau_{prop}$, where $\tau_{prop}$ is the propagation time from the router 200 to the router 100. The propagation time $\tau_{prop}$ can be expressed as $n*T+\tau_{rem}$, where n is an integer and $\tau_{rem}$ is less than T. The propagation time can be measured and accordingly the value of n can be calculated. Assuming that $\tau_{rem}+\tau_{in}$ is less than T, the input expansion interface 138 automatically adjusts $\tau_{fifo}$ so that it is equal to $T-(\tau_{rem}+\tau_{in})$ and this sample is placed on the input expansion bus 150 during the interval from $(n+2)*T$ to $(n+3)*T$. The memory 154 is set to its minimum delay (T) and the memory 144 is set to a delay of $(n+1)*T$, and accordingly, the first sample from the local signal source of the router 200 is placed on the bus 142 during the same operating cycle as the first sample of the signal acquired by the local signal source of the router 100. Accordingly, phase coherency is preserved across all local inputs of the routing switch.

Figure 2:
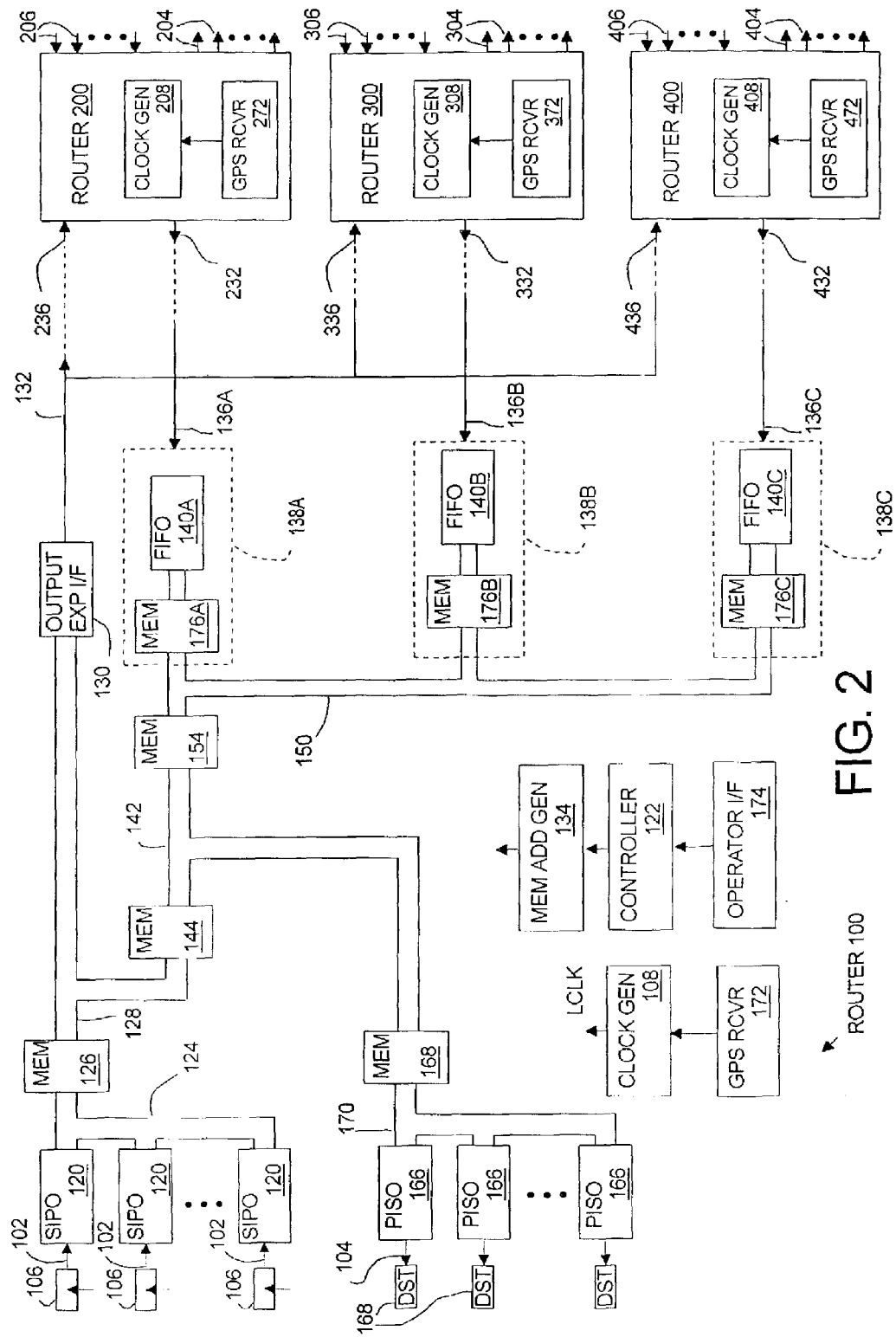
FIG. 2 is a schematic block diagram of a second routing switch in accordance with the present invention.

FIG. 2 illustrates a modification of the routing switch shown in FIG. 1. In the case of FIG. 2, the routing switch includes four routers 100, 200, 300 and 400. The router 100 has three input expansion terminals 136A, 136B and 136C connected to respective input expansion interfaces 138A, 138B, and 138C. Each input expansion interface 138 includes both a FIFO 140 and a buffer memory 176, connected to the bus 150. The output expansion terminal 132 of the router 100 is connected to the input expansion terminals 236, 336 and 436 of the routers 200, 300 and 400 and the output expansion terminals 232, 332 and 432 of the routers 200, 300 and 400 are connected to the input expansion terminals 136A, 136B and 136C respectively of the router 100. The routers 200, 300 and 400 are connected to each other in similar fashion although this is not shown in FIG. 2. In the case of the routing switch shown in FIG. 2, the operating cycle of the bus 142 is divided into 2048 time slots, whereby each operating cycle is able to accommodate 512 subframe data words from each of the four routers.

The buffer memory 176 in each input expansion interface has multiple pages and operates in similar fashion to the memory 144 and is therefore able to delay a data stream by an integer number of intervals T. The three buffer memories 176A, 176B and 176C are adjustable independently of each other.

In general, the routers 100-400 are positioned so that the propagation delay between each two routers is different. By providing the router 100 with an input expansion interface for each of the routers 200, 300 and 400, and including not only a FIFO 140 but also a buffer memory 176 in each input expansion interface, the data streams provided by each of the routers 200, 300 and 400 can be delayed independently of each other so that the local signal sources of the routers 200, 300 and 400 are brought into phase coherency on the input expansion bus 150, and by setting the delay of the memory 144 all signal sources can be brought into phase coherency on the bus 142.

FIG. 2 shows one way of organizing delays to achieve phase coherency over all signal sources on the intermediate bus of each router. Other schemes are possible, however.

It will be appreciated that the invention is not restricted to the particular embodiment that has been described, and that variations may be made therein without departing from the scope of the invention as defined in the appended claims and equivalents thereof. For example, the invention is not restricted to the use of separate buses 124 and 128 for writing to and reading from the memory 126, and a common bus may be used, subject to timing constraints. Further, as described in patent application Ser. No. 09/661,844, an output processor of the routing switch may itself provide several channels. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A method of operating a router having N1 local signal input terminals connected to respective local signal sources which supply respective local input signals, a local output interface including M1 local signal output terminals, and an input expansion terminal, and including a routing means for routing a signal received at any one of the N1 local signal input terminals selectively to any one or more of the M1 local signal output terminals and for routing a signal received at the input expansion terminal selectively to any one or more of the M1 local signal output terminals, the method comprising:

employing the routing means to supply a first input signal received at one of the N1 local input terminals to at least a first of the M1 local output terminals, employing the routing means to supply a second input signal received at the input expansion terminal to at least a second of the M1 local output terminals, and delaying the first input signal relative to the second input signal by a selectively adjustable amount to achieve a predetermined time relationship between the first and second input signals at the local output interface, and wherein the router includes a shared access memory having at least three pages and respective samples of each local input signal are sequentially written to one page of the memory during a first memory access period and read from another page of the memory during a second memory access period, and the delaying step comprises selecting address offset between the first memory access period and the second memory access period to delay the first input signal by at least one memory access period of the shared access memory.

2. A method according to claim 1, wherein the local signal sources include respective samplers for sampling respective analog signals, the router includes a clock generator for generating a local sampling clock for distribution to the samplers, and the method includes employing a global positioning system receiver to control the clock generator.

3. A router for selectively routing input signals to output terminals, said router having N1 local signal input terminals for connection to respective local signal sources for supplying respective local input signals, a local output interface including M1 local signal output terminals, and an input expansion terminal, and including a routing means for routing a signal received at any one of the N1 local signal input terminals selectively to any one or more of the M1 local signal output terminals and for routing a signal received at the input expansion terminal selectively to any one or more of the M1 local signal output terminals, and a delay for delaying an input signal received at a local signal input terminal relative to an input signal received at the input expansion terminal by a selectively adjustable amount to achieve a predetermined time relationship between the input signals at the local output interface, and wherein the routing means includes a shared access memory having at least three pages and a memory access means for writing respective samples of each local input signal to one page of the memory during a first memory access period and reading during a second memory access period from a page that is offset from said one page by a selectively variable address offset.

4. A router according to claim 3, wherein the local signal sources include respective samplers for sampling respective analog signals, and the router includes a clock generator for generating a local sampling clock for distribution to the samplers and a global positioning system receiver to control the clock generator.

5. A method of operating a routing switch including a first router having N1 local signal input terminals, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals and an output expansion terminal and including a second routing means for selectively routing a signal received at any one of the N2 local signal input terminals to the output expansion terminal, and wherein the output expansion terminal of the second router is connected to the input expansion terminal of the first router, and wherein the method comprises:

employing the first router to supply a first signal received at one of the N1 local input terminals to at least a first of the M1 local output terminals, employing the second router to supply a second signal received at one of the N2 local input terminals to the input expansion terminal of the first router, employing the first router to supply the second signal to at least a second of the M1 local output terminals, and delaying the first signal relative to the second signal by a selectively adjustable amount to achieve a predetermined time relationship between the first and second signals at the local output interface of the first router, and wherein the first router includes a shared access memory having at least three pages, respective samples of each signal received at the N1 local signal input terminals are sequentially written to one page of the memory during a first memory access period and read from another page of the memory during a second memory access period, and the delaying step comprises selecting address offset between the first memory access period and the second memory access period to delay the first signal by at least one memory access period of the shared access memory.

6. A method according to claim 5, wherein the local signal input terminals of the first router are connected to respective local signal sources, the local signal sources include respective samplers for sampling respective analog signals, the first router includes a clock generator for generating a local sampling clock for distribution to the samplers, and the method includes employing a global positioning system receiver to control the clock generator.

7. A method according to claim 6, wherein the local signal input terminals of the second router are connected to respective local signal sources, the local signal sources of the second router include respective samplers for sampling respective analog signals, the second router includes a clock generator for generating a local sampling clock for distribution to the samplers of the local signal sources of the first router, and the method includes employing a global positioning system receiver to control the clock generator of the second router, whereby the local sampling clocks of the first and second routers are synchronized.

8. A method of operating a routing switch including a first router having N1 local signal input terminals, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals and an output expansion terminal and including a second routing means for selectively routing a signal received at any one of the N2 local signal input terminals to the output expansion terminal, and wherein the output expansion terminal of the second router is connected to the input expansion terminal of the first router, and wherein the method comprises:

employing the first router to supply a first signal received at one of the N1 local input terminals to at least a first of the M1 local output terminals, employing the second router to supply a second signal received at one of the N2 local input terminals to the input expansion terminal of the first router, employing the first router to supply the second signal to at least a second of the M1 local output terminals, and delaying the first signal relative to the second signal by a selectively adjustable amount to achieve a predetermined time relationship between the first and second signals at the local output interface of the first router, and wherein the first and second routers include first and second local clock generators respectively for controlling operation of the respective routers, and the method comprises controlling the first and second local clock generators to operate in synchronism.

9. A method of operating a routing switch including a first router having N1 local signal input terminals, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals and an output expansion terminal and including a second routing means for selectively routing a signal received at any one of the N2 local signal input terminals to the output expansion terminal, and wherein the output expansion terminal of the second router is connected to the input expansion terminal of the first router, and wherein the method comprises:

employing the first router to supply a first signal received at one of the N1 local input terminals to at least a first of the M1 local output terminals, employing the second router to supply a second signal received at one of the N2 local input terminals to the input expansion terminal of the first router, employing the first router to supply the second signal to at least a second of the M1 local output terminals, and delaying the first signal relative to the second signal by a selectively adjustable amount to achieve a predetermined time relationship between the first and second signals at the local output interface of the first router by an amount to achieve phase coherency of the first and second signals at the local output interface of the first router.

10. A routing switch comprising:

a first router having N1 local signal input terminals connected to respective local signal sources, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals terminals connected to respective local signal sources and also having and an output expansion terminal and including a second routing means for selectively routing a signal received at any one of the N2 local signal input terminals to the output expansion terminal, and wherein the output expansion terminal of the second router is connected to the input expansion terminal of the first router, and the first router includes a delay for delaying an input signal received at a local signal input terminal of the first router relative to an input signal received at the input expansion terminal of the first router by a selectively adjustable amount to achieve a predetermined time relationship between the input signals at the local output interface of the first router, and wherein the local signal sources of the first router include respective samplers for sampling respective analog signals, the first router includes a first clock generator for generating a local sampling clock for distribution to the samplers and a first global positioning system receiver to control the first clock generator, the local signal sources of the second router include respective samplers for sampling respective analog signals, and the second router includes a second clock generator for generating a local sampling clock for distribution to the samplers of the local signal sources of the first router and a second global positioning system receiver to control the second clock generator, whereby the local sampling clocks of the first and second routers are synchronized.

11. A routing switch according to claim 10, wherein the first router includes a shared access memory having at least three pages and a memory access means for writing respective samples of the input signals received at the N1 local signal input terminals to one page of the memory during a first memory access period and reading during a second memory access period from a page that is offset from said one page by a selectively variable address offset.

12. A routing switch comprising:

a first router having N1 local signal input terminals, a local output interface including M1 local signal output terminals, and an input expansion terminal, and including a first routing means for routing a signal received at any one of the N1 local signal input terminals selectively to any one or more of the M1 local signal output terminals and for routing a signal received at the input expansion terminal selectively to any one or more of the M1 local signal output terminals, and a second router having N2 local signal input terminals and an output expansion terminal and including a second routing means for selectively routing a signal received at any one of the N2 local signal input terminals to the output expansion terminal, and wherein the output expansion terminal of the second router is connected to the input expansion terminal of the first router, and the first router includes a delay for delaying an input signal received at a local signal input terminal of the first router relative to an input signal received at the input expansion terminal of the first router by a selectively adjustable amount to achieve a predetermined time relationship between the input signals at the local output interface of the first router, and wherein the first and second routers include first and second local clock generators respectively for controlling operation of the respective routers, and a means for controlling the first and second local clock generators to operate in synchronism.

* * * * *